United States Patent
Lu et al.

(10) Patent No.: US 10,469,374 B2
(45) Date of Patent: Nov. 5, 2019

(54) MULTIPLE PROVIDER FRAMEWORK FOR VIRTUAL SWITCH DATA PLANES AND DATA PLANE MIGRATION

(71) Applicant: Futurewei Technologies, Inc., Plano, TX (US)

(72) Inventors: Yunsong Lu, Mountain View, CA (US); Yan Chen, Dublin, CA (US)

(73) Assignee: Futurewei Technologies, Inc., Plano, TX (US)

( * ) Notice: Subject to any disclaimer, the term of this patent is extended or adjusted under 35 U.S.C. 154(b) by 100 days.

(21) Appl. No.: 15/084,952

(22) Filed: Mar. 30, 2016

(65) Prior Publication Data
US 2017/0289030 A1    Oct. 5, 2017

(51) Int. Cl.
*H04L 12/713* (2013.01)
*H04L 12/751* (2013.01)
*H04L 12/707* (2013.01)
*H04L 12/771* (2013.01)

(52) U.S. Cl.
CPC ............ *H04L 45/586* (2013.01); *H04L 45/02* (2013.01); *H04L 45/22* (2013.01); *H04L 45/56* (2013.01)

(58) Field of Classification Search
CPC ......... H04L 45/02; H04L 45/22; H04L 45/56; H04L 45/586
See application file for complete search history.

(56) References Cited

U.S. PATENT DOCUMENTS

| 2011/0002240 A1 | 1/2011 | Harel et al. |
| 2013/0067466 A1 | 3/2013 | Coombs et al. |

(Continued)

FOREIGN PATENT DOCUMENTS

| CN | 101945038 A | 1/2011 |
| CN | 102075402 A | 5/2011 |

(Continued)

OTHER PUBLICATIONS

U.S. Appl. No. 15/077,461, filed Mar. 22, 2016.
(Continued)

*Primary Examiner* — Andrew Lai
*Assistant Examiner* — M Mostazir Rahman
(74) *Attorney, Agent, or Firm* — Vierra Magen Marcus LLP

(57) ABSTRACT

The disclosure relates to technology for supporting a virtual switch to change data plane providers on a framework supporting multiple data plane providers. A processing device receives a request to change a first data plane provider, where the virtual switch is configured with a topology on the first data plane provider to use a flow management protocol. The virtual switch includes network interfaces connected to ports to enable communication among entities attached to the network interfaces by forwarding data packets within a first datapath of the first data plane. In response to the change, the network interfaces are disconnected, the first datapath is removed and a second datapath is created. The virtual switch is then configured to operate with the second datapath while retaining the flow management protocol and the topology, such that the entities communicate by forwarding data packets within the second datapath on the second data plane.

20 Claims, 8 Drawing Sheets

(56) References Cited

U.S. PATENT DOCUMENTS

| | | |
|---|---|---|
| 2014/0211607 A1* | 7/2014 | Li .................. H04L 49/552 370/219 |
| 2014/0280834 A1* | 9/2014 | Medved ............ H04L 47/122 709/223 |
| 2016/0127226 A1 | 5/2016 | Bays |
| 2016/0301603 A1* | 10/2016 | Park ................ H04L 45/586 |
| 2016/0337896 A1* | 11/2016 | Rajagopalan ..... H04L 41/0893 |
| 2017/0078771 A1 | 3/2017 | Lingampalli |
| 2017/0093811 A1 | 3/2017 | Dolev et al. |
| 2017/0171113 A1 | 6/2017 | Chanda |

FOREIGN PATENT DOCUMENTS

| | | |
|---|---|---|
| CN | 105282004 A | 1/2016 |
| CN | 105391635 A | 3/2016 |
| WO | 2014166399 A1 | 10/2014 |

OTHER PUBLICATIONS

PCT/CN2017/078315, ISR, dated Jun. 1, 2017.
Office Action dated Jan. 19, 2018, in U.S. Appl. No. 15/077,461, 21 pages.
Response to Office Action filed Apr. 9, 2018, in U.S. Appl. No. 15/077,461, 19 pages.
Final Office Action dated Jul. 3, 2018, in U.S. Appl. No. 15/077,461, 20 pages.
Office Action dated Jul. 3, 2018, in U.S. Appl. No. 15/077,461, 20 pages.

\* cited by examiner

MULTIPLE PROVIDER FRAMEWORK FOR VIRTUAL SWITCH DATA PLANES AND DATA PLANE MIGRATION

BACKGROUND

A network switch is a hardware device for making data connections among devices. Switches may be employed to receive, process and forward data packets to their intended destination according to specific flow management protocols (or data forwarding protocols). Moreover, network switches can have two planes: a control plane and a data plane. The control plane is a portion of the system responsible for providing the flow management protocol functions and features of the system. The data plane is responsible for actually receiving, processing and sending data from and to the ports that connect the switch to external sources according to the logic provided by the control plane.

Network switches may be deployed as physical hardware or may be virtually deployed using software that provides network connectivity for systems employing virtualization technologies. Virtualization technologies allow one computer to do the job of multiple computers by sharing resources of a single computer across multiple systems. Through the use of such technology, multiple operating systems and applications can run on the same computer at the same time, thereby increasing utilization and flexibility of hardware. Virtualization allows servers to be decoupled from underlying hardware, thus resulting in multiple VMs sharing the same physical server hardware.

When any of the multiple virtual computer systems communicate one with another, they can communicate within the single physical computing device via the virtual switch. In other words, network traffic with a source and destination within the single physical computing device do not exit the physical computer system.

With network virtualization technology being widely adopted, virtual switch functionalities, protocols, hardware accelerators, etc. are emerging quickly. Under many circumstances, different virtual switch implementations with different protocols from different vendors may be used in a single system, which makes switch configuration tasks complicated or even impossible.

BRIEF SUMMARY

In one embodiment, there is a method for supporting multiple data plane providers in a processing device, comprising receiving a request to change a first data plane provider, wherein a virtual switch is configured with a topology on a first data plane provider to use a flow management protocol, the virtual switch including one or more first network interfaces respectively connected to one or more ports to enable communication among one or more entities attached to the one or more first network interfaces by forwarding data packets within a first datapath of the first data plane; disconnecting the one or more first network interfaces; removing the first datapath of the virtual switch; creating a second datapath on a second data plane of a second data plane provider using the topology and the flow management protocol; configuring the virtual switch to operate with the second datapath and retaining the flow management protocol and the topology, the virtual switch including one or more second network interfaces; and connecting the one or more second network interfaces to a respective one of the one or more ports to enable communication among the one or more entities attached to each of the network interfaces by forwarding data packets within the second datapath on the second data plane.

In another embodiment, there is a non-transitory computer-readable medium storing computer instructions for supporting multiple protocols in a processing device, that when executed by one or more processors, perform the steps of receiving a request to change a first data plane provider, wherein a virtual switch is configured with a topology on a first data plane provider to use a flow management protocol, the virtual switch including one or more first network interfaces respectively connected to one or more ports to enable communication among one or more entities attached to the one or more first network interfaces by forwarding data packets within a first datapath of the first data plane; disconnecting the one or more first network interfaces; removing the first datapath of the virtual switch; creating a second datapath on a second data plane of a second data plane provider using the topology and the flow management protocol; configuring the virtual switch to operate with the second datapath and retaining the flow management protocol and the topology, the virtual switch including one or more second network interfaces; and connecting the one or more second network interfaces to a respective one of the one or more ports to enable communication among the one or more entities attached to each of the network interfaces by forwarding data packets within the second datapath on the second data plane.

In still another embodiment, there is a node for supporting multiple protocols in a network, comprising a memory storage comprising instructions; and one or more processors coupled to the memory that execute the instructions to: receive a request to change a first data plane provider, wherein a virtual switch is configured with a topology on a first data plane provider to use a flow management protocol, the virtual switch including one or more first network interfaces respectively connected to one or more ports to enable communication among one or more entities attached to the one or more first network interfaces by forwarding data packets within a first datapath of the first data plane; disconnect the one or more first network interfaces; remove the first datapath of the virtual switch; create a second datapath on a second data plane of a second data plane provider using the topology and the flow management protocol; configure the virtual switch to operate with the second datapath and retaining the flow management protocol and the topology, the virtual switch including one or more second network interfaces; and connect the one or more second network interfaces to a respective one of the one or more ports to enable communication among the one or more entities attached to each of the network interfaces by forwarding data packets within the second datapath on the second data plane.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the Background.

BRIEF DESCRIPTION OF THE DRAWINGS

Aspects of the present disclosure are illustrated by way of example and are not limited by the accompanying figures for which like references indicate elements.

DETAILED DESCRIPTION

The disclosure relates to technology for a virtual switch framework that allows for the existence of multiple data plane providers which are implemented with software or hardware modules in the same processing device, such as the same computer host. A virtual switch that is running on one of the data plane providers may be migrated to another data plane provider without reconfiguring the virtual switch.

A virtual switch and an associated first datapath is created having a flow management protocol and a topology on a first data plane provider. The first data plane provider may be discoverable and enabled by a first pluggable software module of the virtual switch framework. Once created, the virtual switch can receive and forward packets along the first datapath using the designated flow management protocol(s) provided by the first data plane provider When a request to change or migrate data plane providers is issued, the first datapath is disassociated with the virtual switch and removed. Then, a second datapath at a second data plane provider is created having the same flow management protocol and topology. The second datapath is then associated with the virtual switch. Similarly, the flow management protocol may be discoverable as a second pluggable software module that identifies and enables the second data plane provider. Upon completion of the migration, data packets may be received at and forwarded by the virtual switch along the second datapath on the second data plane provider using the same flow management protocol, without changing the switch topology.

It is understood that the present invention may be embodied in many different forms and should not be construed as being limited to the embodiments set forth herein. Rather, these embodiments are provided so that this disclosure will be thorough and complete and will fully convey the invention to those skilled in the art. Indeed, the invention is intended to cover alternatives, modifications and equivalents of these embodiments, which are included within the scope and spirit of the invention as defined by the appended claims. Furthermore, in the following detailed description of the present invention, numerous specific details are set forth in order to provide a thorough understanding of the present invention. However, it will be clear to those of ordinary skill in the art that the present invention may be practiced without such specific details.

Figure 1:
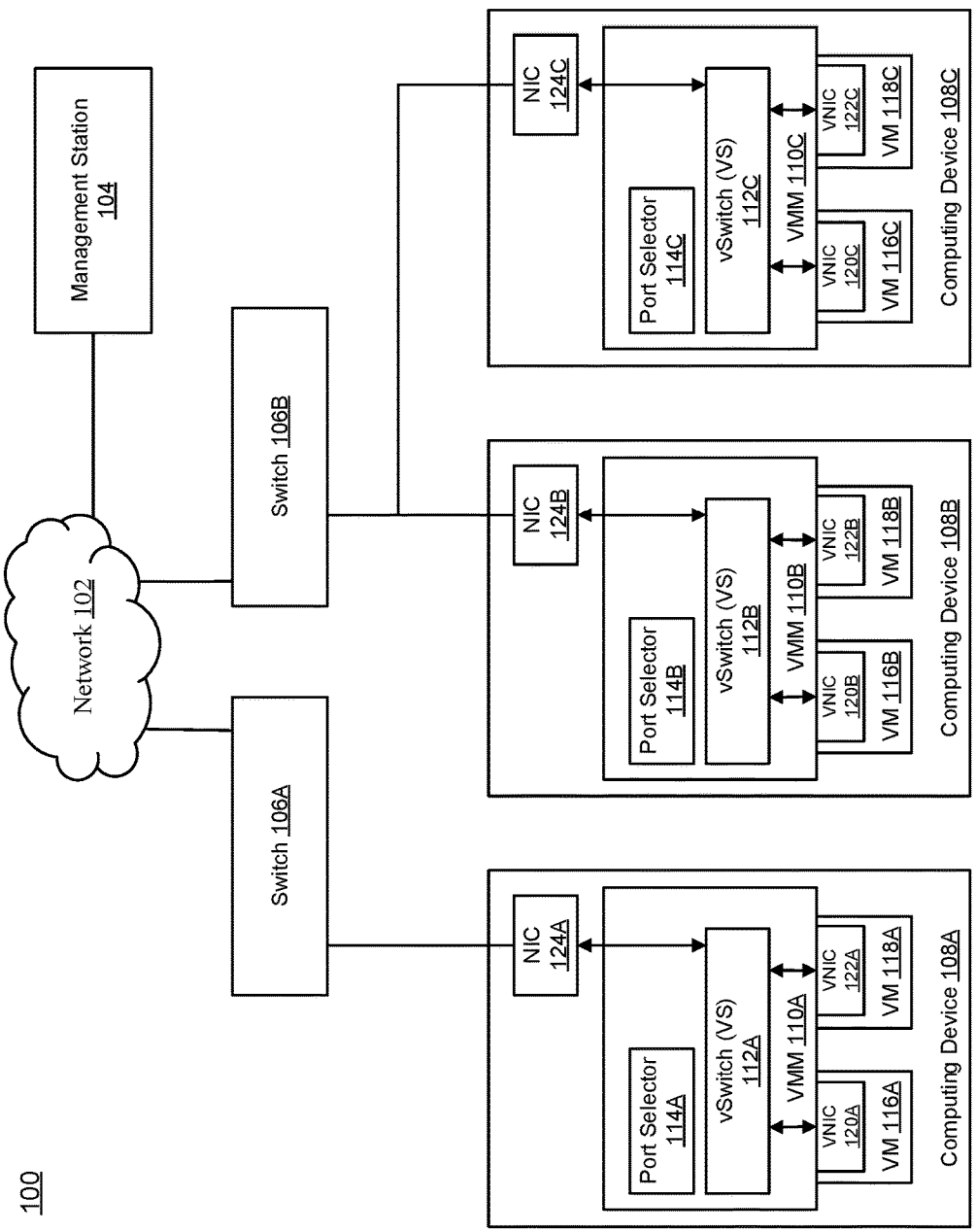
FIG. 1 illustrates a processing environment for a group of computing devices connected to a management station via a network switch.

FIG. 1 illustrates a processing environment for a group of computing devices connected to a management station via a network switch. As illustrated, the processing environment 100 includes, but is not limited to, network 102, management station 104, switches 106A, 106B and computing devices 108A, 108B, 108C. It is appreciated that the illustrated embodiment is intended as an example, and that any number of computing devices, switches, networks and management stations may be employed.

The network 102 may be any public or private network, or a combination of public and private networks such as the Internet, and/or a public switched telephone network (PSTN), or any other type of network that provides the ability for communication between computing resources, components, users, etc., and is coupled in the example embodiment to a respective one of switches 106A, 106B. Each of the switches 106A, 106B (which may be physical or virtual) includes a respective forwarding data structure (e.g., a forwarding information base (FIB) or forwarding table, not shown) by which switches 106A, 106B forward incoming data packets toward a destination based upon, for example, OSI Layer 2 addresses (e.g., based on MAC addresses) contained in the packets.

The computing devices 108A, 108B, 108C, such as a host, are coupled to a respective one of the switches 106A, 106B. Each of the computing devices 108A, 108B, 108C respectively includes, for example, a virtual machine (VM) 116A/118A, 116B/118B, 116C/118C and a virtual machine monitor (VMM) or hypervisor 110A, 110B, 110C and a network interface card (NIC) 124A, 124B, 1224C. Each of the VMMs 110A, 110B, 110C include, for example, a virtual switch or vSwitch (VS) 112A, 112B, 112C and a port selector 114A, 114B and 114C. The VMs 116A/B, 116B/118B, 116C/118C each include a corresponding NIC 120A/122A, 120B/122B, 120C/122C, such as a virtual NIC (vNIC). It is appreciated that the components, such as the NIC, vNIC, Switch, vSwitch, etc., may be exchanged or replaced with either physical or virtual components, or any combination of hardware and/or software.

Each computing device 108A, 108B and 108C executes a respective one of VMMs 110A, 110B, 110C, which virtualizes and manages resources on the respective computing device 108A, 108B and 108C. The computing devices 108A, 108B and 108C may be any type of device, such as a server or router, which may implement the procedures and processes described herein as detailed in FIGS. 3-8 below. Moreover, the computing devices 108A, 108B and 108C for example, may execute the VMMs 110A, 110B, 110C under the direction of a human and/or automated cloud administrator at a management station 104 coupled to the computing devices 108A, 108B and 108C by network 102.

VMMs 110A, 110B, 110C on computing devices 108A, 108B, 108C support the execution and operation of VMs 116A/118A, 116B/118B, 118C/118C, and implement VSs 112A, 112B, 112C and port selectors 114A, 114B, 114C in support of respective VMs. The port selectors 114A, 114B, 114C determine the type of the ports of the VSs 112A, 112B, 112C and ensure proper connection of the NICs 124A, 124B, 124C to the network 102. It should also be appreciated that while two VMs are illustrated as being deployed on each of the computing devices, any number of VMs and interfaces may be employed in the computing devices. Each of the VMs 116A, 116B, 116C may be associated with various entities, such as data providers or consumers (explained further below).

VMs 116A/118A, 116B/118B, 116C/118C each include a respective vNIC 120A/122B, 120B/122b, 120C/122C. A vNIC 120A/122B, 120B/122B, 120C/122C facilitates communication via a port of a particular VS. Communications between VMs 116A, 118A, 116B, 118B, 116C, 118C may be routed via software of VSs 112A, 112B, 112C and physical switches 106A, 106B.

Figure 2:
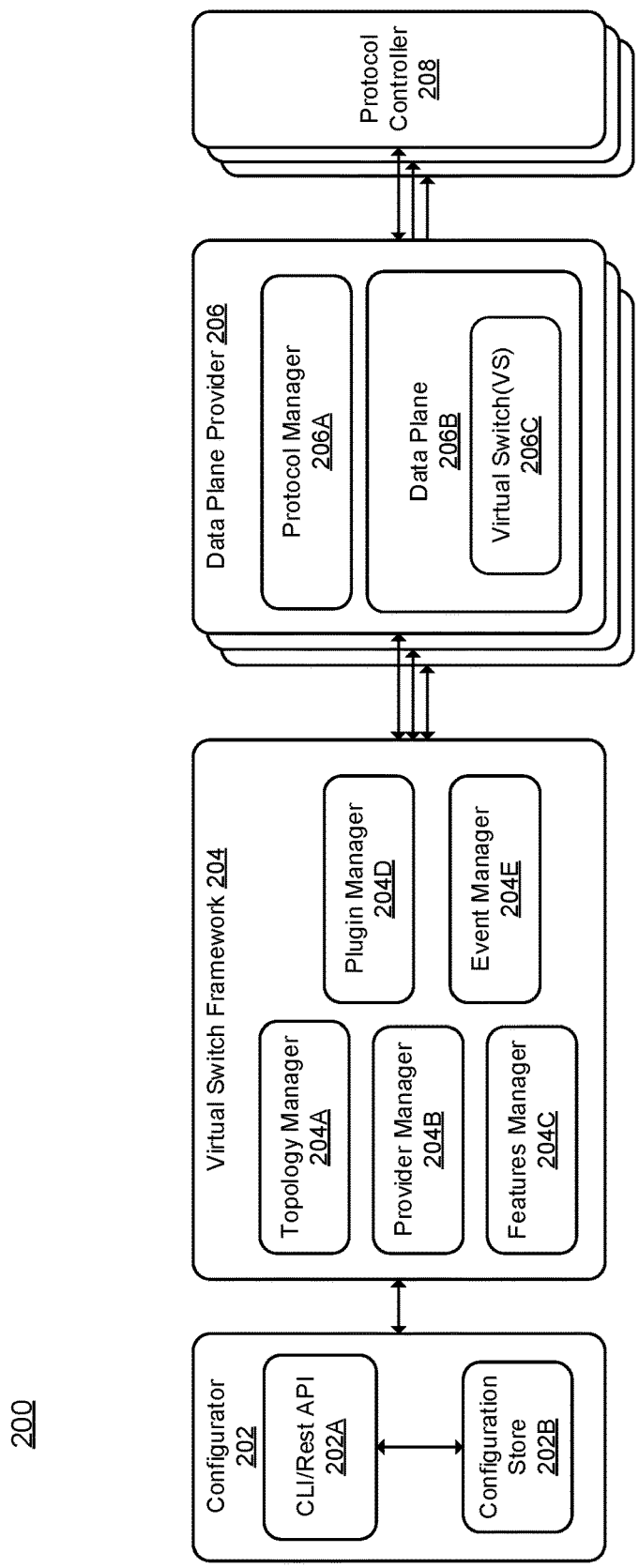
FIG. 2 illustrates a virtual switching management system having pluggable flow management protocols.

FIG. 2 illustrates a virtual switching management system having pluggable flow management protocols. The virtual switching management system 200 includes, for example, a configurator 202, a virtual switch framework 204, a data plane provider 206 and a protocol controller 208. A data plane provider may be any hardware or software module which can receive, process and send data packets with the logic (flow management protocols) prescribed by its controller. With this system, multiple protocols from various data plane providers may be supported. Thus, the system is not limited to a layer 2 or layer 3 switch or similar, but may also include other types of flow management protocols such as openflow or a fully customizable switching policy. Whereas traditional virtual switch implementations are designed to support data plane provider specific flow management protocols, the management system 200 provides a framework to support multiple data plane providers with different flow management protocols enabled by pluggable software modules (i.e., plugin or plugin module), and the flow management protocol of a running virtual switch can be changed without changing the already configured switching topologies. Flow management protocols can therefore be changed or modified at runtime, and multiple switch instances can support different protocols at the same time.

The configurator 202 includes a command line interface (CLI) and/or application programming interface (API) 202A that enables a user of the system to configure and manage the virtual switch objects and their respective topologies. The configurator 202 is also responsible for maintaining the configuration records. Such records may be stored in configuration store 202B. The configuration store 202B may be, for example, a database, memory, storage system or any other component or element capable of storing information. Moreover, the configuration storage 202B may reside outside of the configurator 202 as independent storage or on any other system component that is in communication with the management system 200.

VS framework 204 includes virtual switch topology configuration and switch object management functionality. As noted above, the VS on the framework 204 may be configured (or re-configured) by the configurator 202. The VS framework 204 includes, but is not limited to, a topology manager 204A, a provider manager 204B, a features manager 204C, a plugin manager 204D and an event manager 204E. The topology manager 204A is responsible for configuring and managing data plane objects and their topologies (namely the virtual switches and their ports and connected interfaces).

The provider manager 204B is responsible for discovering and managing specific instances of the data plane providers 206 using, in some embodiments, various software and/or hardware co-processors and accelerators. Thus, the provider manager 204B may identify data plane providers 206 via the plugin modules which enable and manage their respective providers and protocols. The provider manager 204B may also monitor for newly added plugins to assist in discovering and managing instances of the new protocols and data plane providers 206. Once discovered, the data plane providers 206 and their respective plugins may be configured to interface with and operate on the virtual switching management system 200, or to otherwise enable or make available any new functionality.

The features manager 204C manages common features of the data plane objects, such as monitoring protocols, quality of service, etc. However, the features manager 204C is not typically responsible for features related to the flow management protocols. In general, the features manager 204C will be responsible for making decisions about whether a data plane provider 206 implements certain features and requests execution of those features when appropriate. In one embodiment, the features manager 204C may be responsible for managing the creation and removal of switching and port features.

The plugin manager 204D manages the pluggable software modules (plugins) to enable the data plane provider's 206 flow management protocols. The plugin manager 204D is responsible for integrating functionality from the plugins.

The plugin manager 204D may also be responsible for loading plugins. In another embodiment, the plugin manager 204D may apply loading criteria such that specific plugins meeting the loading criteria are loaded. For example, loading criteria may include a timestamp (e.g., load plugins created after a specific date), version number (e.g., load the latest version number of a plugin if multiple versions are present), or specific names of data plane providers 206.

The plugin manager 204D may also assist in determining which plugins to load and gather information necessary to load selected plugins. The plugin manager 204D may also receive configuration data from the configuration store 202B of configurator 202.

Plugins may have a common interface that enables it to be loaded by plugin manager. Each plugin is to perform specific functions (e.g., enable flow management protocols) or to perform specific configuration tasks and/or provide specific information to communicate with various components in the system. When a plugin is loaded, any plugin-specific initialization may also be performed. Examples of plugin-specific initialization include creating and/or verifying communication connections, loading classes, directing plugin manager 204D to load or unload additional plugins, etc.

The event manager 204E is responsible for handling events at runtime and scheduling tasks for the virtual switch framework 204.

Data plane provider 206 is responsible for providing provider-specific flow management protocols and implementing APIs to interactive with the virtual switch framework 204. The data plane provider 206 includes a protocol manager 206A and data plane 206B. The data plane providers 206 may be represented by the pluggable software modules (plugins) that may be implemented as specific flow management protocols and which implement APIs to interact with the VS framework 204. These plugins may enable the data plane 206B to forward packets of information based on the flow management protocols defined by the plugin.

As appreciated, the data plane 206B may receive packets, process and forward packets in a manner using the flow management protocols provided by the data plane provider. Specifically, the data plane is responsible for the ability of a computing device, such as a router or server, to process and forward packets, which may include functions such as packet forwarding (packet switching), which is the act of receiving packets on the computing device's interface. The data plane 206B may also be responsible for classification, traffic shaping and metering.

The plugins enable the respective data plane providers 206 to implement data forwarding functionalities according to predefined or customized flow management protocols. In one embodiment, each plugin may be a stand-alone software library module that is independent from the VS framework 204. Such independent plugins may be added and/or removed. In another embodiment, one or more plugins may rely on the VS framework 204 to provide additional functionality.

Figure 3:
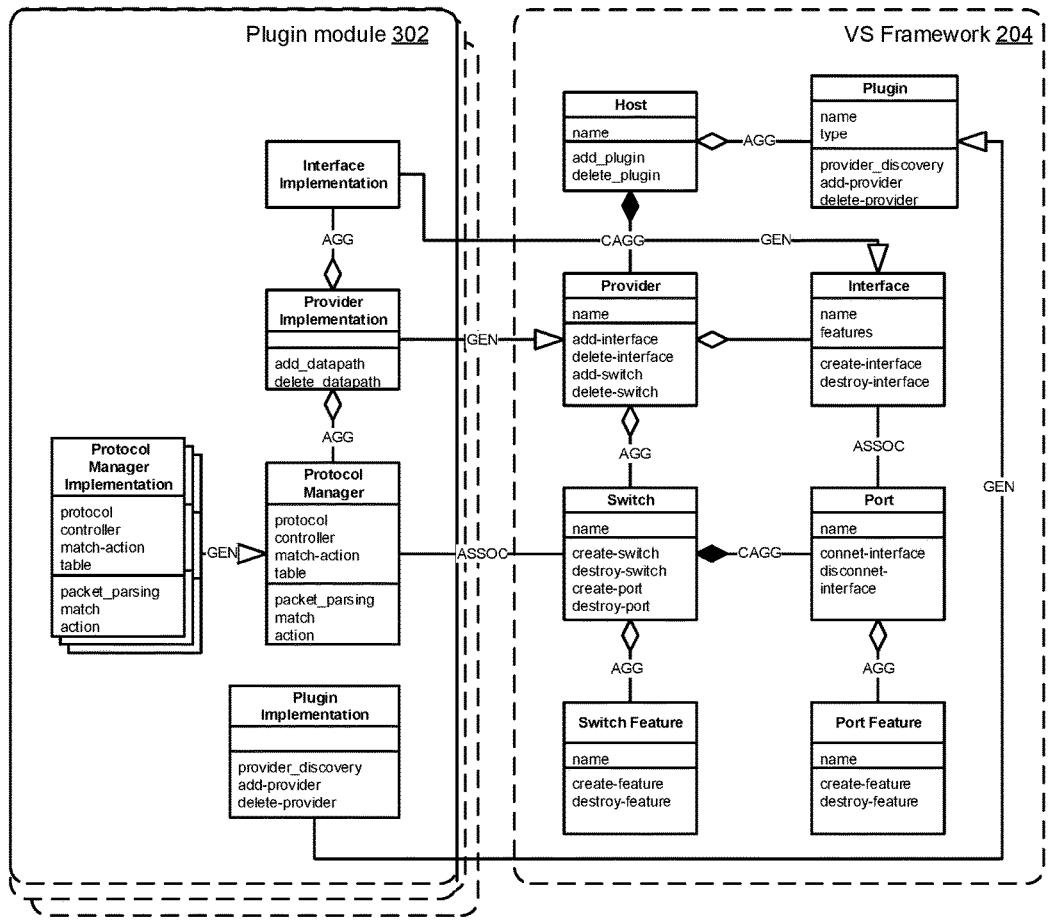
FIG. 3 illustrates a unified modeling language (UML) static class diagram of a data model for the virtual switch framework of FIG. 2.

FIG. 3 illustrates a unified modeling language (UML) static class diagram of a data model for the virtual switch framework of FIG. 2. The model allows the VS framework 204 to be implemented to support multiple virtual switches on different data plane providers with different flow management protocols enabled by respective plugin modules, and to support changing flow management protocols without changing switch topology configurations.

A class describes a set of objects that share the same specifications of features, constraints, and semantics. For example, the object for a plugin contains the class "plugin," with attributes "name, type" and method of execution as "provider_discovery," "add_provider" and "delete_provider." In addition, relationships may exist between objects such that connections are found in a class and object diagram. Relationships depicted in the diagram of FIG. 3 are as follows. An association (ASSOC) specifies a semantic relationship that can occur between typed instances. Aggregation (AGG) is more specific than an association, such as an association that represents a part-whole or part-of relationship. An association (ASSOC) may represent a composite aggregation (i.e., a whole/part relationship). Composite aggregation (CAGG) is a strong form of aggregation that requires a part instance be included in at most one composite at a time, and a composition is represented by the attribute on the part end of the association being set to true. The graphical representation of a composition relationship is a filled diamond shape on the containing class end of the tree of lines that connect contained class(es) to the containing class. A generalization (GEN) is a taxonomic relationship between a more general classifier and a more specific classifier. The graphical representation of a generalization is a hollow triangle shape on the superclass end of the line that connects it to one or more subtypes.

Figure 4:
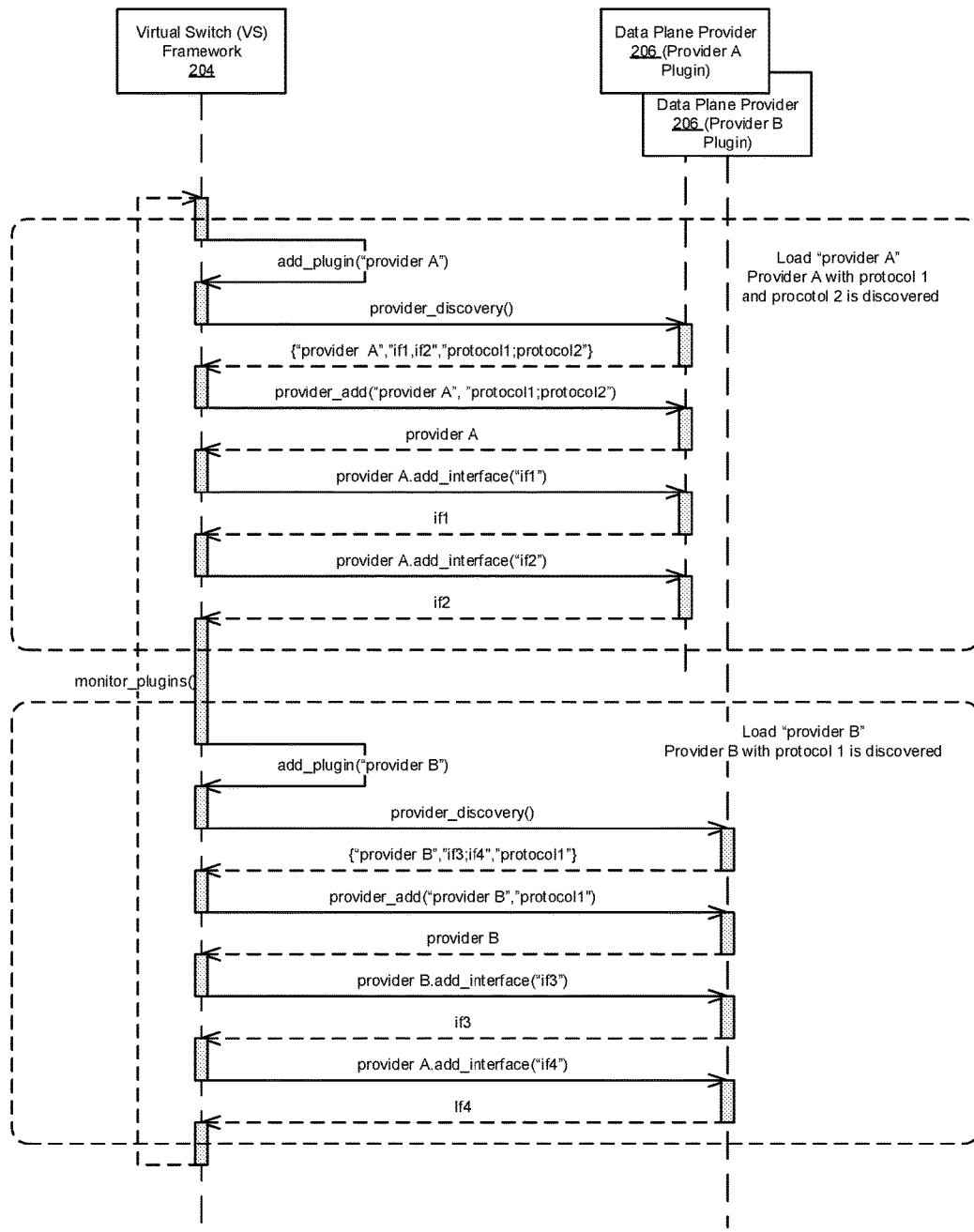
FIG. 4 illustrates a sequence diagram for changing and discovering forwarding protocols of providers.

FIG. 4 illustrates a sequence diagram for loading plugins, discovering providers and the flow management protocols they support. Implementing the process of FIG. 4 allows the virtual switching management system 200 to dynamically add, change or modify protocols from at least a first protocol to at least one other protocol. In the discussion that follows, VS framework 204 performs the process detailed in the sequence diagram in association with the data plane 206B of data plane provider 206 (e.g., provider A and provider B). However, it is appreciated that such operation is not limited to the aforementioned components. Moreover, the process disclosed in FIG. 4 is one example of discovering providers with different flow management protocols. It is therefore appreciated that the process disclosed is a non-limiting example.

In the example depicted in FIG. 4, after the plugin manager of VS framework 204 finds and then calls add_plugin ("plugin module for provider A") to load the plugin which enables the provider A 206A with specific flow management protocols, such as protocol 1 and protocol 2. The VS framework 204 then calls the "provider_discovery( )" of the newly added (or modified) plugin to obtain the property information of the provider. The data plane provider A 206 that is enabled by the plugin returns the name of the provider, along with the associated network interface (s) and flow management protocol(s) it supports. For example, data plane provider 206 (provider A) has two network interfaces ("if1" and "if2") and supports two flow management protocols ("protocol1" and "protocol2"), and returns {"provider A", "if1, if2", "protocol1 and protocol2"}. Upon the data plane provider A 206 returning the information to the VS framework 204, the VS framework 204 registers the provider A with the property information, including the supported protocols and associated network interfaces for later use by calling methods such as "provider_add( )" and "providerA.add_interface( )."

A similar process occurs for the discovery of another data plane provider 206, such as provider B. In this example, provider B has two network interfaces ("if3" and "if4") and a single flow management protocol ("protocol1"), which information is stored for example in a plugin module of data plane provider 206.

Figure 5:
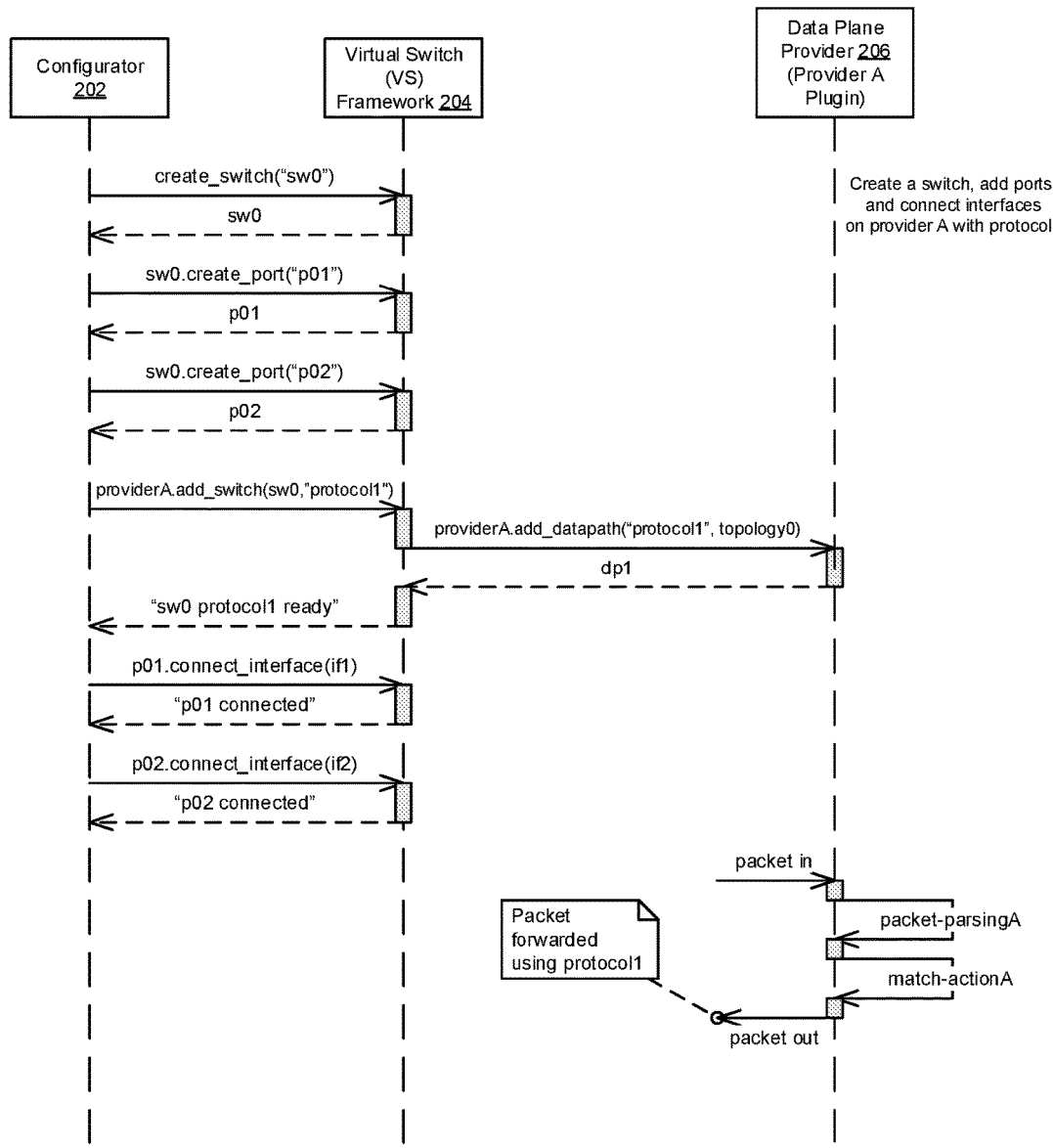
FIG. 5 illustrates a sequence diagram for creating a switch associated with the discovered data plane providers of FIG. 4.

FIG. 5 illustrates a sequence diagram for creating a switch associated with the discovered data plane providers of FIG. 4. In the example embodiment, a switch is created such that a protocol being used for communication between entities may be changed, for example during runtime, to a newly discovered protocol without affecting the switch topology configuration. In the explanation that follows, the configurator 202, VS framework 204 and data plane provider 206 are responsible for implementing the process. However, it is appreciated that implementation is not limited to these components.

The process of creating the switch is initiated by configurator 202 first constructing a switch topology. For example, a switch topology "topology0" can be constructed by the following process: the configurator 202 calls "create_switch ("sw0") to instruct the VS framework 204 to create the switch object ("sw0"), and then calls "sw0.create_port ("p01")" to create a first port ("p01") associated with the switch. Similarly, a second port ("p02") is created associated with the switch object ("sw0"). It is appreciated that the two ports are an example, and that any number of ports may be associated with the switch. In one embodiment, the number of ports created correspond to the number of network interfaces on the data plane provider 206 to be used.

Once the switch object ("sw0") and associated topology "topology0" have been created, the configurator 202 may call "providerA.add_switch(sw0, "protocol1")" to instruct the VS framework 204 to create the switch on the data plane provider 206 (provider A) using the first protocol (protocol1).

The VS framework 204 then sends a request to the data plane provider 206 ("providerA.add_datapath("protocol1", "topology0") to create a datapath (dp1). The creation of the datapath (dp1) from the data plane provider 206 (provider A) to the VS framework 204 means the switch ("sw0") is now ready for forwarding data between the ports according to "protocol1" along the datapath dp1 (after interfaces are connected to ports). The configurator 202 can instruct the VS framework 204 to connect the first port ("p01") to the first network interface ("if1") by calling "p01.connect_interface (if1)." Similarly, the configurator 202 can instruct the VS framework 204 to connect the second port ("p02") to the second network interface ("if2") by calling "p02.connect_interface(if2)."

The virtual switch (VS) 206C may now be used to send data packets using the flow management protocol (in this case, protocol1) of the data plane provider 206 (in this case, provider A). Thus, entities may now communicate with one another via the first ("if1") and second ("if2") network interfaces connected to the ports of virtual switch (VS) 206C with the designated flow management protocol "protocol1." For example, a VM 116A may send a data packet via the virtual switch (VS) 206C to another VM 118A using protocol1 along the datapath dp1 via vNIC 120A and vNIC 122A. As data packets arrive at the virtual switch (VS) 206C created on behalf of the data plane provider 206 (provider A), they may be parsed (e.g., determine a destination address of the packet) and matched to specific actions and forwarded using the flow management protocol (e.g., protocol1) by the data plane 206B.

It is appreciated that while two VMs are communicating in the disclosed embodiment, any number of VMs may be communicating through any number of network interfaces and ports, and the disclosed embodiment is a non-limiting example.

Figure 6:
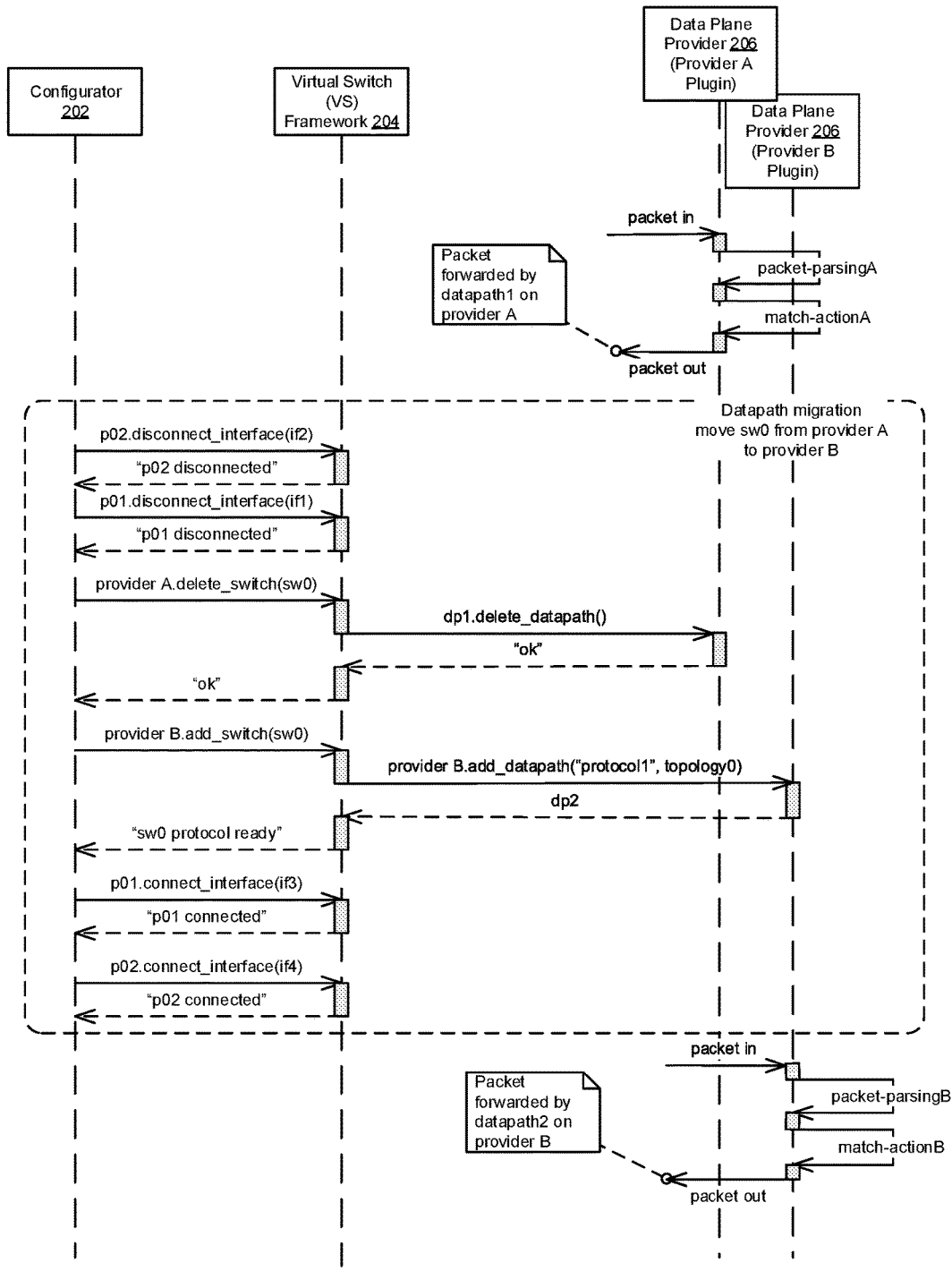
FIG. 6 illustrates a sequence diagram of migrating data plane providers according to one embodiment.

FIG. 6 illustrates a sequence diagram of migrating a virtual switch from one data plane provider to another data plane provider according to one embodiment. Prior to migration from one data plane provider 206 (e.g., provider A) to another data plane provider (e.g., provider B), data packets may be received, parsed (e.g., determine a destination address of the packet) and matched to specific actions and forwarded from one entity such as VM 116B to another entity, such as VM 118B by data plane provider A.

To change or migrate a virtual switch to a different data plane provider 206 (e.g., migrate from data plane provider A to data plane provider B), configurator 202 initiates a disconnection of interfaces from the port of the VS, for example, by issuing a "p02.disconnect_interface(if2)" request. This request effectively commands the VS framework 204 to disconnect network interfaces (if2) from associated ports (port02) of the VS. If additional network interfaces and ports exist, the configurator 202 may also initiate a request to disconnect these network interfaces with the data plane provider A from associated ports, for example, by issuing a "p01.disconnect_interface(if1)" request. In this example, the issued request effectively commands the VS framework 204 to disconnect the network interfaces (if1) from associated ports (port01) of the VS on the data plane provider A.

After the network interfaces have been disconnected from the ports, the configurator 202 requests that the datapath associated with the VM (in this example, dp1) of the data plane 206B of the data plane provider A be removed. The request issued may be, for example, "dp1.delete_datapath( )" Once the datapath dp1 has been removed, the configurator 202 may issue a request to add a new datapath (in this example, dp2) on another data plane provider 206 (e.g., data plane provider B) and associate it with the VS. Datapath dp2 is configured with the same flow management protocol and topology of the VS.

The request to add a new datapath may be, for example, "provider B.add_datapath("protocol1", topology0)." Upon completion of adding the datapath dp2, the VS (the virtual switch with data plane provider B) is "ready." Recall from the example above that the VS of data plane provider B has network interfaces (if3, if4). Thus, the network interfaces (if3, if4) associated with data plane provider B may then be connected to ports (p01, p02) respectively in a manner as described above. For example, the configurator 202 may issue a request as "p01.connect_interface(if3)" and "p02.connect_interface(if4)."

Notably, after changing the datapath to a different data plane provider, the flow management protocol, switch topology and switch states such as statistics and switching logics of the VS remains unchanged. Accordingly, the VS on data plane provider 206 (provider B) is capable of forwarding data packets for the same entities with the same flow management protocol using the data plane provider B. The received data packets may be parsed (e.g., determine a destination address of the packet) and matched to specific actions and forwarded by data plane provider B from one entity to another, such as between VM 116B and 118B if they are attached to the interfaces of provider B (if3, if4) respectively.

Figures 7, 8:
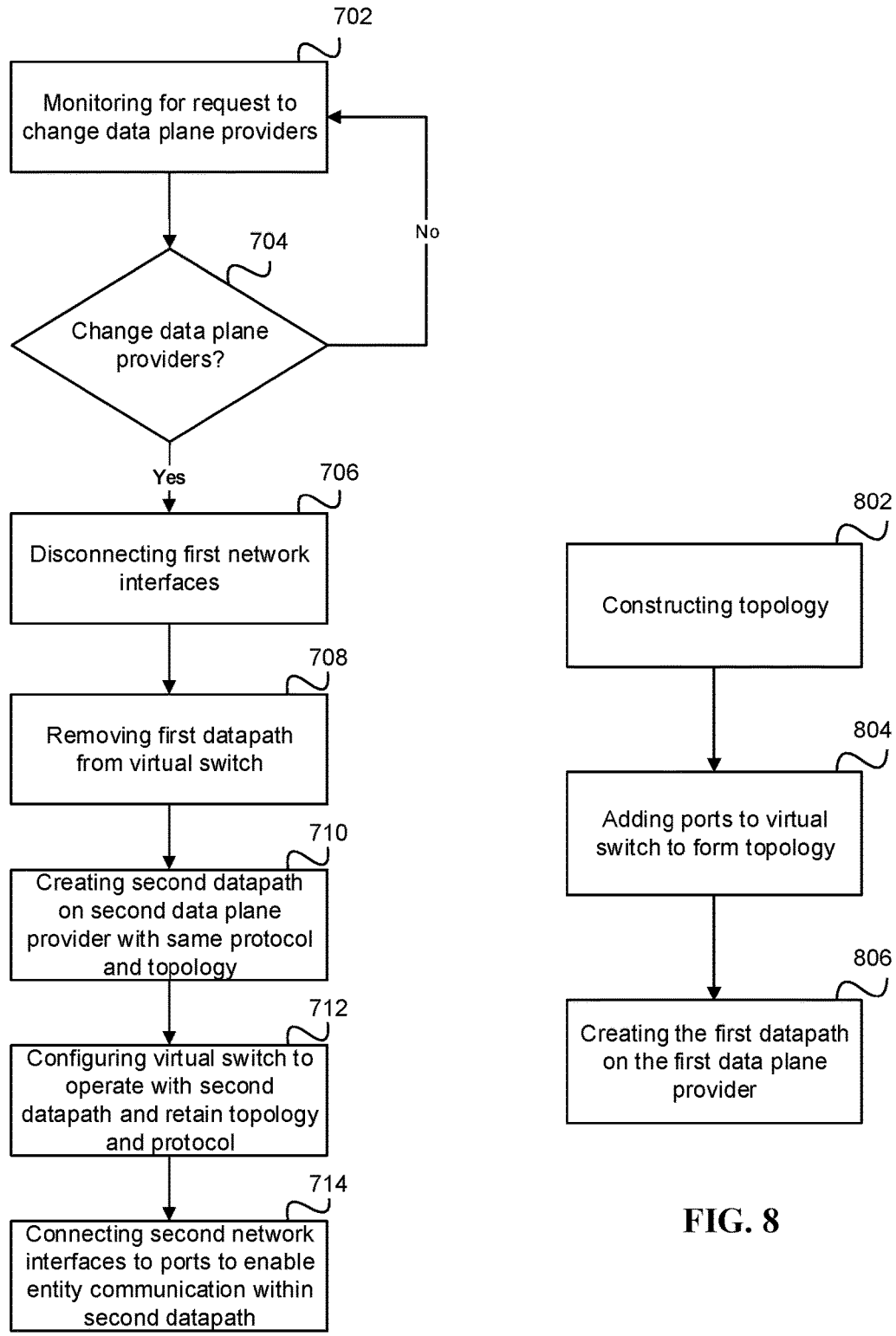
FIG. 7 illustrates one embodiment of a flow diagram for configuring a virtual switch with multiple protocols using a pluggable software module in accordance with FIG. 1-6.
FIG. 8 illustrates another flow diagram for configuring a virtual switch with multiple protocols using a pluggable software module (plugin) in accordance with FIG. 1-6.

FIG. 7 illustrates one embodiment of a flow diagram for migrating one data plane provider to another data plane provider in accordance with FIG. 1-6. At 702, configurator 202, via VS framework 204, monitors the system for a request to change or migrate from a first data plane provider 206 (e.g., provider A) to a second data plane provider 206 (e.g., provider B). If a request is not detected at 704, then the process continues to monitor at 702. Otherwise, at 704, when a request to change data plane providers 206 is received, the configurator 202 issues a command to the VS framework 204 to disconnect the network interfaces from the VS at 706. For example, the configurator 202 issues the commands "p02.disconnect_interface(if1)" and "p01.disconnect_interface(if2)" to the VS framework 204.

At 708, in response to the configurator 202 issuing a command to delete the VS 206C, the first datapath is disassociated with the VS 206C and removed. For example, the configurator may issue a command "providerA.delete_switch(sw0)" to the VS framework 204, which in turn issues a command to provider A, such as "dp1.delete_datapath( )" Subsequently, the configurator issues another command to the VS framework 204 to add a new VS 206C, such as "providerB.add_switch( )" In response, the VS framework 204 issues a command to provider B to create a second datapath on a second data plane (associated with provider B) using the same flow management protocol and topology, at 710. For example, the issue command may be "providerB.add_datapath ('protocol1', topology0')."

At 712, the VS 206C is configured to operate with the second datapath while retaining the topology and flow management protocol that was associated with the first datapath. The network interfaces are then respectively connected to ports on the VS 206C to enable communication between entities connected to the respective network interface by forwarding data packets within the second datapath on the second data plane at 714.

FIG. 8 illustrates another flow diagram for migrating one data plane provider to another data plane provider in accordance with FIG. 7. At 802, as part of configuring the VS 206C, a topology (e.g., topology0) is constructed by creating a virtual switch object on the VS framework 204, and adding one or more ports to the VS 206C at 804. After the topology is constructed, a datapath (e.g. dp2) is created on the data plane provider 206 using the topology (topology0) and the flow management protocol at 806. The VS 206C is ready to perform according to the flow management protocol as set forth in the plugin by connecting the network interface(s) to corresponding port(s) to enable communication of entities attached to the network interface(s) by implementing the flow management protocol within the second datapath. Accordingly, a first entity (e.g., VM 116A) may communicate via vNIC 120A with a second entity (e.g. VM 118A) via vNIC 122A using a migrated provider 206.

Figure 9:
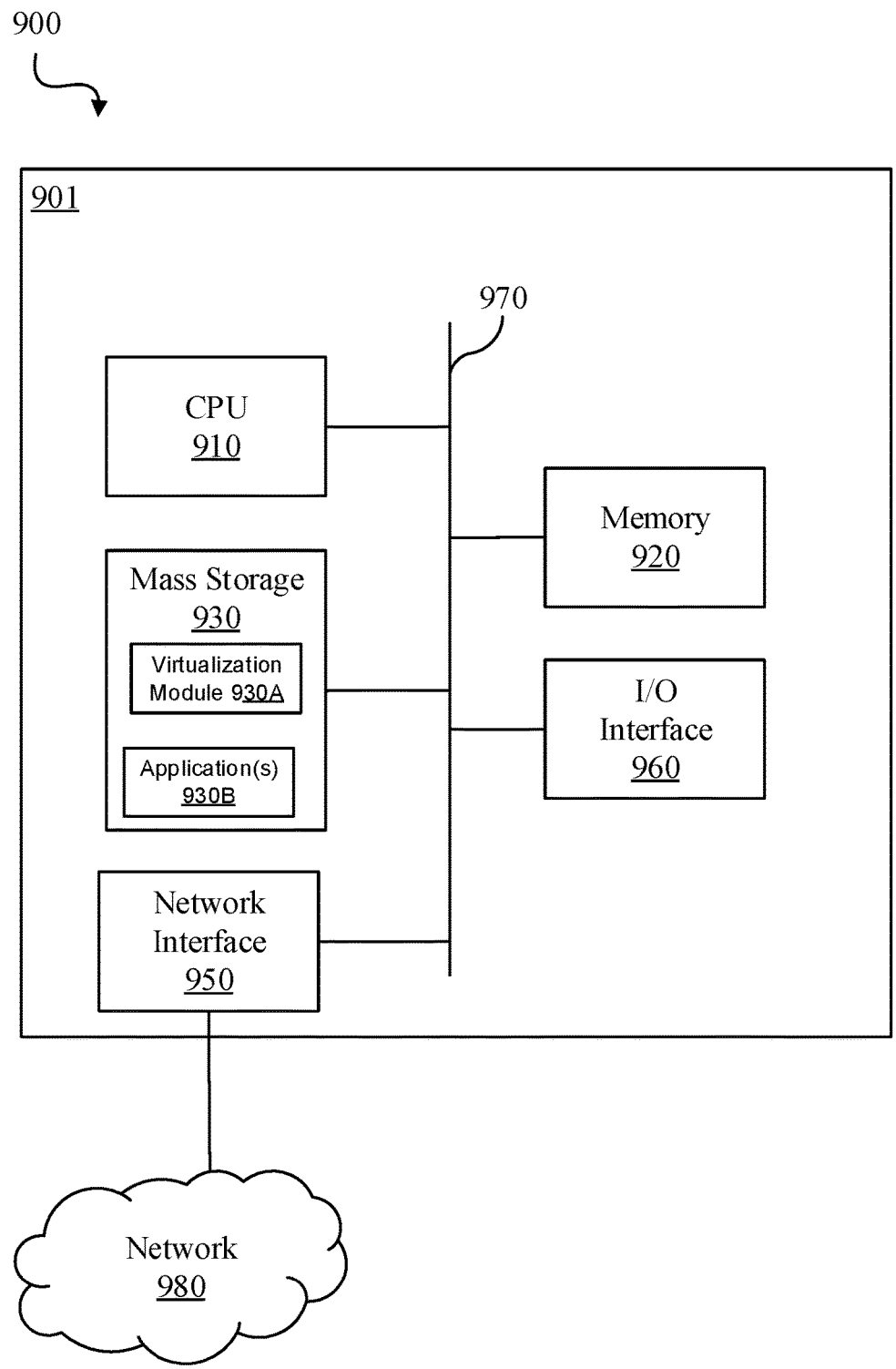
FIG. 9 illustrates a block diagram of a network system that can be used to implement various embodiments.

FIG. 9 is a block diagram of a network system that can be used to implement various embodiments. Specific devices may utilize all of the components shown, or only a subset of the components, and levels of integration may vary from device to device. Furthermore, a device may contain multiple instances of a component, such as multiple processing units, processors, memories, transmitters, receivers, etc. The network system may comprise a processing unit 901 equipped with one or more input/output devices, such as network interfaces, storage interfaces, and the like. The processing unit 901 may include a central processing unit (CPU) 910, a memory 920, a mass storage device 930, and an I/O interface 960 connected to a bus 970. The bus 970 may be one or more of any type of several bus architectures including a memory bus or memory controller, a peripheral bus or the like. The CPU 910 may comprise any type of electronic data processor, which may be configured to read and process instructions stored in the memory 920.

The memory 920 may comprise any type of system memory such as static random access memory (SRAM), dynamic random access memory (DRAM), synchronous DRAM (SDRAM), read-only memory (ROM), a combination thereof, or the like. In an embodiment, the memory 920 may include ROM for use at boot-up, and DRAM for program and data storage for use while executing programs. In embodiments, the memory 920 is non-transitory. The mass storage device 930 may comprise any type of storage device configured to store data, programs, and other information and to make the data, programs, and other information accessible via the bus. The mass storage device 930 may comprise, for example, one or more of a solid state drive, hard disk drive, a magnetic disk drive, an optical disk drive, or the like. The mass storage device 930 may also include a virtualization module 930A and application(s) 930B. Virtualization module 930A may represent, for example, a hypervisor of a computing device 108, and applications 930B may represent different VMs. The virtualization module 930A may include a switch (not shown) to switch packets on one or more virtual networks and be operable to determine physical network paths. Applications 930B may each include program instructions and/or data that are executable by computing device 108. As one example, application(s) 930B may include instructions that cause computing device 108 to perform one or more of the operations and actions described in the present disclosure.

The processing unit 901 also includes one or more network interfaces 950, which may comprise wired links, such as an Ethernet cable or the like, and/or wireless links to access nodes or one or more networks 980. The network interface 950 allows the processing unit 901 to communicate with remote units via the networks 980. For example, the network interface 950 may provide wireless communication via one or more transmitters/transmit antennas and one or more receivers/receive antennas. In an embodiment, the processing unit 901 is coupled to a local-area network or a wide-area network for data processing and communications with remote devices, such as other processing units, the Internet, remote storage facilities, or the like.

As a result of the virtual switch and pluggable flow management discussed above, several advantages are provided including, but not limited to, user selection of desired combinations of software or support hardware implementations for a data plane, users can migrate data planes from one data plane provider to another data plane provider dynamically in order to optimize performance and utilize system resources more efficiently, migrating from software to hardware and from hardware to software, providing migration decisions based on the current utilization of the system resources, including but not limited to CPU, memory, DMA, I/O bandwidth and quality of service, multiple data plane providers may be employed in the system, performance of the system may be maximized and the system resource utilizations optimized given the ability to perform data plane migration automatically, reduce the complicity of switch/resource management by eliminating manual switch reconfiguration tasks, reduce human error when changing switch configuration.

In accordance with various embodiments of the present disclosure, the methods described herein may be implemented using a hardware computer system that executes software programs. Further, in a non-limited embodiment, implementations can include distributed processing, component/object distributed processing, and parallel processing. Virtual computer system processing can be constructed to implement one or more of the methods or functionalities as described herein, and a processor described herein may be used to support a virtual processing environment.

Aspects of the present disclosure are described herein with reference to flowchart illustrations and/or block diagrams of methods, apparatuses (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable instruction execution apparatus, create a mechanism for implementing the functions/acts specified in the flowchart and/or block diagram block or blocks.

The terminology used herein is for the purpose of describing particular aspects only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The aspects of the disclosure herein were chosen and described in order to best explain the principles of the disclosure and the practical application, and to enable others of ordinary skill in the art to understand the disclosure with various modifications as are suited to the particular use contemplated.

For purposes of this document, each process associated with the disclosed technology may be performed continuously and by one or more computing devices. Each step in a process may be performed by the same or different computing devices as those used in other steps, and each step need not necessarily be performed by a single computing device.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method for supporting multiple data plane providers in a processing device, the method comprising:
   receiving a request to change a first data plane provider, wherein a virtual switch is configured with a topology on the first data plane provider to use a flow management protocol, the virtual switch including one or more first network interfaces respectively connected to one or more ports to enable communication among one or more entities attached to the one or more first network interfaces by forwarding data packets within a first datapath of the first data plane;
   disconnecting the one or more first network interfaces;
   removing the first datapath of the virtual switch;
   creating a second datapath on a second data plane of a second data plane provider while maintaining the topology of the virtual switch and the flow management protocol of the first datapath;
   configuring the virtual switch to operate with the second datapath and retaining the flow management protocol and the topology, the virtual switch including one or more second network interfaces; and
   connecting the one or more second network interfaces to a respective one of the one or more ports to enable communication among the one or more entities attached to each of the network interfaces by forwarding data packets within the second datapath on the second data plane;
   detecting the first data plane provider, the first data plane provider discoverable via a first pluggable software module that identifies the first data plane of the first data plane provider with one or more network interfaces and enables one or more flow management protocols; and
   detecting the second data plane provider, the second data plane provider discoverable via a second pluggable software module that identifies the second data plane of the second data plane provider with one or more network interfaces and enables the one or more flow management protocols,
   wherein the first pluggable software module and the second pluggable software module of the first data plane and second data plane are dynamically loadable during runtime to enable at least one of adding another data plane provider and changing one of the first virtual switches and second virtual switch without reconfiguring the topology and the flow management protocol.

2. The method of claim 1, further comprising:
   constructing the topology of the virtual switch by creating a virtual switch object on a virtual switch framework;
   adding the one or more ports to the virtual switch to form the topology; and
   creating the first datapath on the first data plane provider using the topology with the first flow management protocol.

3. The method of claim 1, wherein the virtual switch is configurable during runtime with the one or more flow management protocols without changing the topology.

4. The method of claim 1, wherein the entities are at least one of virtual machines, namespaces and containers.

5. The method of claim 1, further comprising storing the first pluggable software module and the second pluggable software module of the first data plane provider and second data plane provider in a data store.

6. The method of claim 1, wherein the detecting comprises discovering the first pluggable software module and the second pluggable software module by monitoring the data store for at least one of newly added plugins for enabling at least one of new data plane providers and changing the first virtual switch to the second virtual switch.

7. The method of claim 1, wherein the network interface is one of a virtual network interface and a physical network interface.

8. The method of claim 1, further comprising configuring the virtual switch with a first network interface of the one or more first network interfaces connected a first port of the one or more ports and a second network interface of the one or more first network interfaces connected to a second port of the one or more ports.

9. A non-transitory computer-readable medium storing computer instructions for supporting multiple protocols in a processing device, that when executed by one or more processors, perform following steps of:
   receiving a request to change a first data plane provider, wherein a virtual switch is configured with a topology on the first data plane provider to use a flow management protocol, the virtual switch including one or more first network interfaces respectively connected to one or more ports to enable communication among one or more entities attached to the one or more first network interfaces by forwarding data packets within a first datapath of the first data plane;
   disconnecting the one or more first network interfaces;
   removing the first datapath of the virtual switch;
   creating a second datapath on a second data plane of a second data plane provider while maintaining the topology of the virtual switch and the flow management protocol of the first datapath;
   configuring the virtual switch to operate with the second datapath and retaining the flow management protocol and the topology, the virtual switch including one or more second network interfaces;
   connecting the one or more second network interfaces to a respective one of the one or more ports to enable communication among the one or more entities attached to each of the network interfaces by forwarding data packets within the second datapath on the second data plane;
   detecting the first data plane provider, the first data plane provider discoverable via a first pluggable software module that identifies the first data plane of the first data plane provider with one or more network interfaces and enables one or more flow management protocols; and
   detecting the second data plane provider, the second data plane provider discoverable via a second pluggable software module that identifies the second data plane of the second data plane provider with one or more network interfaces and enables the one or more flow management protocols;
   wherein the first pluggable software module and the second pluggable software module of the first data plane and second data plane are dynamically loadable during runtime to enable at least one of adding another data plane provider and changing one of the first virtual switch and second virtual switch without reconfiguring the topology and the flow management protocol.

10. The non-transitory computer-readable medium of claim 9, with the one or more processors further performing the steps of:

constructing the topology of the virtual switch by creating a virtual switch object on a virtual switch framework;
adding the one or more ports to the virtual switch to form the topology; and
creating the first datapath on the first data plane provider using the topology with the first flow management protocol.

11. The non-transitory computer-readable medium of claim 9, wherein the virtual switch is configurable during runtime with the one or more flow management protocols without changing the topology.

12. The non-transitory computer-readable medium of claim 9, wherein the entities are at least one of virtual machines, namespaces and containers.

13. The non-transitory computer-readable medium of claim 9, wherein the one or more processors further performing the steps of storing the first pluggable software module and the second pluggable software module of the first data plane provider and second data plane provider in a data store.

14. The non-transitory computer-readable medium of claim 9, wherein the detecting comprises discovering the first pluggable software module and the second pluggable software module by monitoring the data store for at least one of newly added plugins for enabling at least one of new data plane providers and changing the first virtual switch to the second virtual switch.

15. The non-transitory computer-readable medium of claim 9, wherein the network interface is one of a virtual network interface and a physical network interface.

16. The non-transitory computer-readable medium of claim 9, further comprising configuring the virtual switch with a first network interface of the one or more first network interfaces connected a first port of the one or more ports and a second network interface of the one or more first network interfaces connected to a second port of the one or more ports.

17. A node for supporting multiple protocols in a network, the node comprising:
a memory storage comprising instructions; and
one or more processors coupled to the memory storage that execute the instructions to:
receive a request to change a first data plane provider, wherein a virtual switch is configured with a topology on the first data plane provider to use a flow management protocol, the virtual switch including one or more first network interfaces respectively connected to one or more ports to enable communication among one or more entities attached to the one or more first network interfaces by forwarding data packets within a first datapath of the first data plane;
disconnect the one or more first network interfaces;
remove the first datapath of the virtual switch;
create a second datapath on a second data plane of a second data plane provider while maintaining the topology of the virtual switch and the flow management protocol of the first datapath;
configure the virtual switch to operate with the second datapath and retaining the flow management protocol and the topology, the virtual switch including one or more second network interfaces;
connect the one or more second network interfaces to a respective one of the one or more ports to enable communication among the one or more entities attached to each of the network interfaces by forwarding data packets within the second datapath on the second data plane;
detect the first data plane provider, the first data plane provider discoverable via a first pluggable software module that identifies the first data plane of the first data plane provider with one or more network interfaces and enables one or more flow management protocols; and
detect the second data plane provider, the second data plane provider discoverable via a second pluggable software module that identifies the second data plane of the second data plane provider with one or more network interfaces and enables the one or more flow management protocols,
wherein the first pluggable software module and the second pluggable software module of the first data plane and second data plane are dynamically loadable during runtime to enable at least one of adding another data plane provider and changing one of the first virtual switches and second virtual switch without reconfiguring the topology and the flow management protocol.

18. The node of claim 17, wherein the one or more processors further execute the instructions to:
construct the topology of the virtual switch by creating a virtual switch object on a virtual switch framework;
add the one or more ports to the virtual switch to form the topology; and
create the first datapath on the first data plane provider using the topology with the first flow management protocol.

19. The node of claim 17, wherein the virtual switch is configurable during runtime with the one or more flow management protocols without changing the topology.

20. The node of claim 17, wherein the one or more processors further execute the instructions to configure the virtual switch with a first network interface of the one or more first network interfaces connected a first port of the one or more ports and a second network interface of the one or more first network interfaces connected to a second port of the one or more ports.

* * * * *